A. A. SCHNITKER.
EDUCATIONAL APPARATUS.
APPLICATION FILED JAN. 28, 1922.
1,433,850.
Patented Oct. 31, 1922.
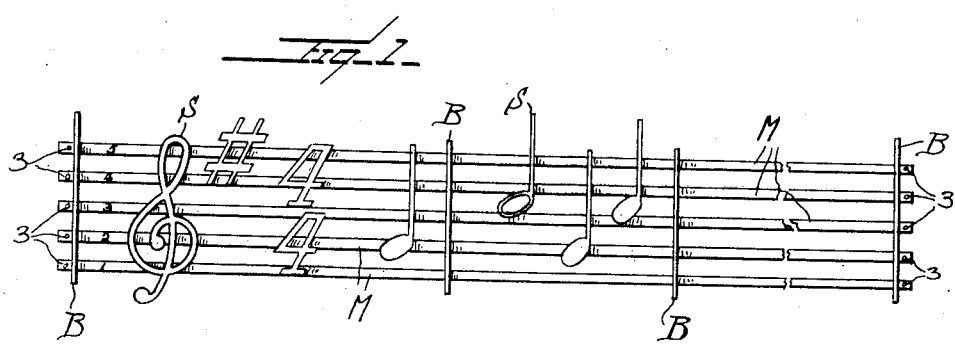
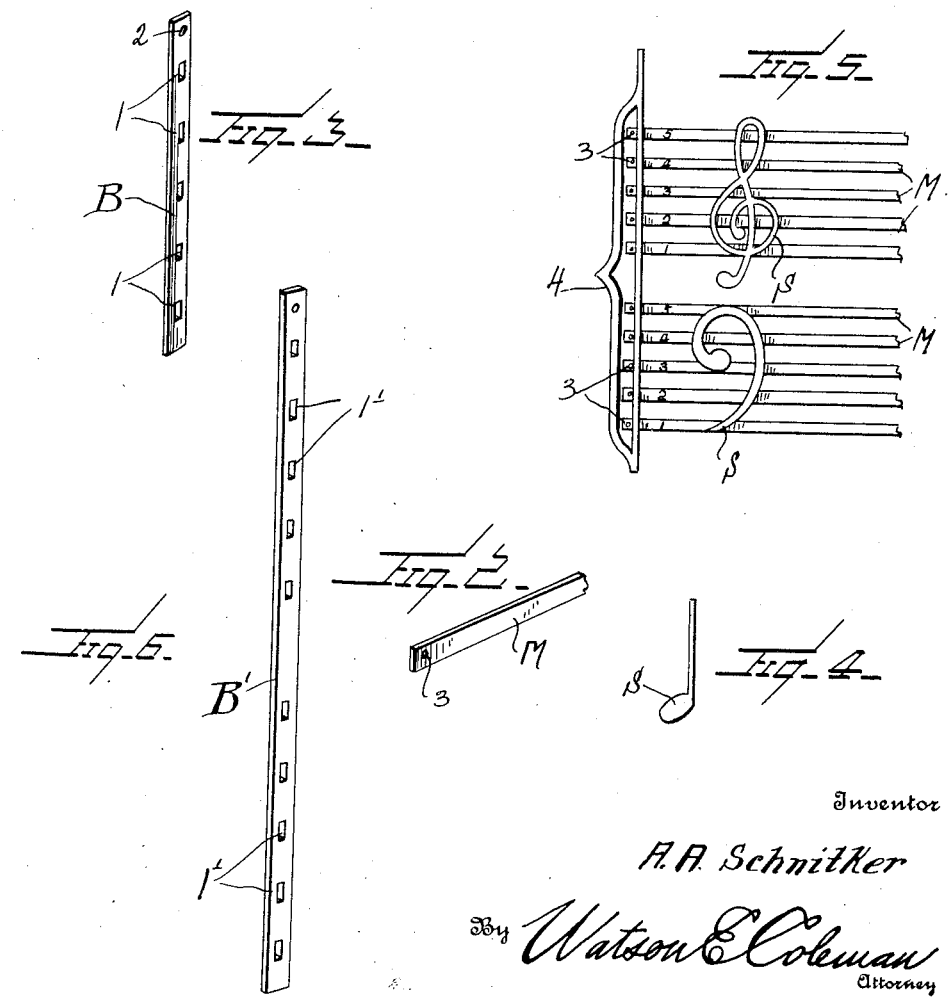
Inventor
A. A. Schnitker
By Watson E. Coleman
Attorney Patented Oct. 31, 1922.

1,433,850

UNITED STATES PATENT OFFICE.

ADELAIDE A. SCHNITKER, OF ARENZVILLE, ILLINOIS.

EDUCATIONAL APPARATUS.

Application filed January 28, 1922. Serial No. 532,386.

*To all whom it may concern:*

Be it known that I, ADELAIDE A. SCHNITKER, a citizen of the United States, residing at Arenzville, in the county of Cass and State of Illinois, have invented certain new and useful Improvements in Educational Apparatus, of which the following is a specification, reference being had to the accompanying drawings.

This invention relates to certain improvements in educational apparatus and has relation more particularly to a chart for the teaching of music, and it is an object of the invention to provide a novel and improved apparatus or chart of this general character wherein the various parts thereof are separable so that the student will be required to construct and arrange the chart in accordance with the lesson it is desired to be taught.

Another object of the invention is to provide a novel and improved device of this general character embodying supporting members of magnetized material together with symbols or characters produced of a material which will be attracted by the magnetized members so that said symbols or characters may be positioned as desired upon the supporting members and maintained in such arrangement.

The invention consists in the details of construction and in the combination and arrangement of the several parts of my improved educational apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation of an apparatus constructed in accordance with an embodiment of my invention;

Figure 2 is a fragmentary view in perspective of one of the magnetized members as herein employed;

Figure 3 is a view in perspective of one of the bars as herein embodied;

Figure 4 is an elevational view of one of the symbols or characters unapplied;

Figure 5 is a fragmentary elevational view illustrating a further embodiment of my invention; and Figure 6 is an enlarged view in perspective of an end bar for the double staff illustrated in Figure 5.

My improved educational apparatus or chart, as herein disclosed, is particularly adapted for use in the teaching of music, and as herein embodied the apparatus or chart comprises a plurality of elongated staff members or strips M, each of said members or strips being of a magnetized material. In practice, I have found it of particular advantage to have each of the members or strips M about three feet long and about three-thirty-seconds of an inch in thickness.

In practice, the members or strips M are arranged in a series of five to provide for the lines of the staff and the members or strips M of each series are consecutively numbered from "1" to "5" so that it may be thoroughly impressed upon the mind of a student, and especially a young child, that there are five lines to the staff.

The members or strips M are maintained in assembled relation by the bars B, each of said bars B being provided with a series of equidistantly spaced openings 1 through which the members or strips M are freely disposed and whereby the bar B may be adjusted lengthwise of the members or strips M to the position desired. The end bars B are provided at their upper end portions with the openings 2 to provide means whereby cords or other members may be engaged with said bars to suspend the assembled chart as may be desired. The extremities of the members or strips M are provided with the openings 3 through which suitable keys are adapted to be inserted whereby it is assured that the end bars B will not become accidentally displaced.

The symbols or characters S adapted for use in connection with my improved apparatus or chart are formed of steel or other material which will be attracted by the magnetized members or strips M so that said symbols or characters S may be held upon the members or strips M or therebetween, as may be required, entirely by the magnetization of the members or strips M. These characters or symbols S will comprise the clefs, time signatures, notes, slurs, accents, rests, and other symbols or characters employed in connection with music and of a number which it is believed will best comply with the requirements of practice.

When it is desired to teach piano music with the use of an apparatus or chart constructed in acordance with an embodiment of my invention, the end bars B′ are of such a length and provided with suitable slots 1′ whereby both the treble staff and bass staff may be properly reproduced upon the mounting of the desired members or strips M′. One of the bars B′ has associated therewith the bracket 4.

With the use of my improved apparatus or chart, the various symbols S may be readily applied as desired either by the teacher or the student and its use will possess the further advantage in that it will readily permit the student to construct the chart whereby a medium is provided to cause greater interest being given by the student to the lesson. This is especially true in connection with children who, by natural tendency, will be attracted by the character of the device.

From the foregoing description it is thought to be obvious that an educational apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An apparatus of the class described comprising a plurality of magnetized strips, bars provided with openings through which said strips are freely disposed, and symbols of a material to be attracted by the magnetized strips.

2. An apparatus of the class described comprising a plurality of magnetized strips, bars provided with openings through which said strips are freely disposed, and symbols of a material to be attracted by the magnetized strips, certain of said bars being provided with means for use in suspending the assembled device.

3. An apparatus of the class described comprising a plurality of magnetized strips, bars provided with openings through which said strips are freely disposed, symbols of a material to be attracted by the magnetized strips, and means associated with the extremities of the strips to hold the applied bars against removal.

In testimony whereof I hereunto affix my signature.

ADELAIDE A. SCHNITKER.